US012654688B2

(12) United States Patent

Kupfer et al.

(10) Patent No.: US 12,654,688 B2

(45) Date of Patent: Jun. 16, 2026

(54) CONTROL OF AUTONOMOUS PARKING OF VEHICLES TO SELECT OPTIMAL PARKING LOCATIONS

(71) Applicant: GM GLOBAL TECHNOLOGY OPERATIONS LLC, Detroit, MI (US)

(72) Inventors: Samuel B. Kupfer, Oak Park, MI (US); Mayssaa El Rifai, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 18/633,973

(22) Filed: Apr. 12, 2024

(65) Prior Publication Data

US 2025/0319862 A1     Oct. 16, 2025

(51) Int. Cl.
   B60W 30/06          (2006.01)

(52) U.S. Cl.
   CPC ......... B60W 30/06 (2013.01); B60W 2420/00 (2013.01); B60W 2555/20 (2020.02); B60W 2556/00 (2020.02)

(58) Field of Classification Search
   CPC .......................... B60W 30/06; B60W 2555/20
   See application file for complete search history.

(56) References Cited

U.S. PATENT DOCUMENTS

| | | | | |
|---|---|---|---|---|
| 9,870,707 | B2 * | 1/2018 | Korman | G08G 1/144 |
| 11,699,345 | B2 * | 7/2023 | Dudar | B60W 30/06 340/932.2 |
| 12,128,878 | B1 * | 10/2024 | Funke | G08G 1/146 |
| 12,269,508 | B1 * | 4/2025 | Funke | B60W 40/02 |
| 2013/0285841 | A1 | 10/2013 | Kirsch | |
| 2014/0303806 | A1 * | 10/2014 | Bai | G06Q 10/40 701/1 |
| 2017/0144654 | A1 * | 5/2017 | Sham | B60W 30/06 |
| 2017/0267233 | A1 * | 9/2017 | Minster | B60W 30/06 |
| 2018/0001930 | A1 * | 1/2018 | Sham | B62D 15/0285 |
| 2018/0194343 | A1 * | 7/2018 | Lorenz | B60W 30/06 |
| 2018/0215374 | A1 * | 8/2018 | Lee | B62D 15/0285 |
| 2019/0012917 | A1 * | 1/2019 | Sofra | G08G 1/143 |
| 2019/0259277 | A1 * | 8/2019 | Dudar | G08G 1/14 |
| 2020/0254997 | A1 * | 8/2020 | Mueller | B62D 15/0285 |
| 2021/0331665 | A1 * | 10/2021 | Sugano | B60W 30/06 |
| 2022/0013012 | A1 * | 1/2022 | Higuchi | G08G 1/143 |
| 2022/0144342 | A1 * | 5/2022 | Jang | B60W 30/06 |
| 2022/0388414 | A1 * | 12/2022 | Salter | B60L 53/36 |
| 2024/0395146 | A1 * | 11/2024 | Gilbert-Eyres | G08G 1/146 |

FOREIGN PATENT DOCUMENTS

| | | |
|---|---|---|
| DE | 102015108678 A1 | 12/2015 |
| DE | 102021002223 A1 | 6/2021 |
| DE | 102021121822 A1 | 3/2022 |

* cited by examiner

*Primary Examiner* — Thomas E Worden

(74) *Attorney, Agent, or Firm* — Ingrassia Fisher & Lorenz, LLP | IF&L

(57)          ABSTRACT

A method and system include receiving a request for autonomous parking of a vehicle; upon receiving the request, obtaining information as to a plurality of potential parking spots, including as to their respective effects on a temperature of the vehicle; selecting, via a processor of the vehicle, one of the plurality of potential parking spots as a selected parking spot for the vehicle, based on the information, including the respective effects on the temperature of the vehicle; and autonomously parking the vehicle in the selected parking spot, in accordance with instructions provided by the processor.

20 Claims, 4 Drawing Sheets

CONTROL OF AUTONOMOUS PARKING OF VEHICLES TO SELECT OPTIMAL PARKING LOCATIONS

INTRODUCTION

The technical field generally relates to platforms such as vehicles and, more specifically, to methods and systems for controlling autonomous parking to select optimal parking locations, including based on temperature and sunlight, and including to preserve battery capacity and vehicle range.

Certain vehicles today have autonomous parking functionality in which the vehicle is driven, in whole or in part, via autonomous driving during a parking maneuver. However, in certain situations, such techniques may not provide optimal parking spaces for the vehicle.

Accordingly, it is desirable to provide improved methods and systems for controlling autonomous parking for vehicles, including selecting optimal parking locations. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes receiving a request for autonomous parking of a vehicle; upon receiving the request, obtaining information as to a plurality of potential parking spots, including as to their respective effects on a temperature of the vehicle; selecting, via a processor of the vehicle, one of the plurality of potential parking spots as a selected parking spot for the vehicle, based on the information, including the respective effects on the temperature of the vehicle; and autonomously parking the vehicle in the selected parking spot, in accordance with instructions provided by the processor.

Also in an exemplary embodiment, the step of obtaining the information includes obtaining temperature data and light intensity data as to the plurality of potential parking spots; and the selected parking spot is selected via the processor using the temperature data and the light intensity data.

Also in an exemplary embodiment, the selected parking spot is selected via the processor based on a light intensity associated with the selected parking spot, in combination with weather conditions surrounding the vehicle.

Also in an exemplary embodiment, the selected parking spot is selected via the processor to be a shaded parking spot when an ambient temperature exceeds a predetermined temperature threshold value and a light intensity from the sun exceeds a predetermined light intensity threshold; and a sunny parking spot when the ambient temperature exceeds the predetermined temperature threshold value and the light intensity from the sun is less than the predetermined light intensity threshold.

Also in an exemplary embodiment, the selected parking spot is selected via the processor in a manner that maximizes a capacity of a rechargeable energy storage system (RESS) of the vehicle, based at least in part on the information, including the respective effects on the temperature of the vehicle.

Also in an exemplary embodiment, the selected parking spot is selected via the processor in a manner that maximizes a range of the vehicle, based at least in part on the information, including the respective effects on the temperature of the vehicle.

Also in an exemplary embodiment, the selected parking spot is selected via the processor in a manner that maximizes comfort of one or more passengers of the vehicle, based at least in part on the information, including the respective effects on the temperature of the vehicle.

Also in an exemplary embodiment, the selected parking spot is selected via the processor based also on a maximum time for parking.

Also in an exemplary embodiment, the selected parking spot is selected via the processor based also on a maximum distance to a destination for a user of the vehicle.

In another exemplary embodiments, a system is provided that includes one or more sensors and a processor. The one or more sensors are configured to at least facilitate receiving a request for autonomous parking of a vehicle; and, upon receiving the request, obtaining information as to a plurality of potential parking spots, including as to their respective effects on a temperature of the vehicle. The processor is coupled to the one or more sensors, and is configured to at least facilitate selecting one of the plurality of potential parking spots as a selected parking spot for the vehicle, based on the information, including the respective effects on the temperature of the vehicle; and autonomously parking the vehicle in the selected parking spot, in accordance with instructions provided by the processor.

Also in an exemplary embodiment, the one or more sensors are configured to at least facilitate obtaining temperature data and light intensity data as to the plurality of potential parking spots; and the processor is further configured to at least facilitate selecting the selected parking spot using the temperature data and the light intensity data.

Also in an exemplary embodiment, the processor is further configured to at least facilitate selecting the selected parking spot based on a light intensity associated with the selected parking spot, in combination with weather conditions surrounding the vehicle.

Also in an exemplary embodiment, the processor is further configured to at least facilitate selecting the selected parking spot to be a shaded parking spot when an ambient temperature exceeds a predetermined temperature threshold value and a light intensity from the sun exceeds a predetermined light intensity threshold; and a sunny parking spot when the ambient temperature exceeds the predetermined temperature threshold value and the light intensity from the sun is less than the predetermined light intensity threshold.

Also in an exemplary embodiment, the processor is further configured to at least facilitate selecting the selected parking spot in a manner that maximizes a capacity of a rechargeable energy storage system (RESS) of the vehicle, based at least in part on the information, including the respective effects on the temperature of the vehicle.

Also in an exemplary embodiment, the processor is further configured to at least facilitate selecting the selected parking spot in a manner that maximizes a range of the vehicle, based at least in part on the information, including the respective effects on the temperature of the vehicle.

Also in an exemplary embodiment, the processor is further configured to at least facilitate selecting the selected parking spot in a manner that maximizes comfort of one or more passengers of the vehicle, based at least in part on the information, including the respective effects on the temperature of the vehicle.

Also in an exemplary embodiment, the processor is further configured to at least facilitate selecting the selected parking spot based also on a maximum time for parking.

Also in an exemplary embodiment, the processor is further configured to at least facilitate selecting the selected parking spot based also on a maximum distance to a destination for a user of the vehicle.

In another exemplary embodiment, a vehicle is provided that includes a drive system, one or more sensors, and a processors. The one or more sensors are configured to at least facilitate receiving a request for autonomous parking of the vehicle; upon receiving the request, obtaining information as to a plurality of potential parking spots, including as to their respective effects on a temperature of the vehicle; and a processor that is coupled to the one or more sensors and that is configured to at least facilitate selecting one of the plurality of potential parking spots as a selected parking spot for the vehicle, based on the information, including the respective effects on the temperature of the vehicle; and autonomously parking the vehicle in the selected parking spot, in accordance with instructions provided by the processor that are carried out by the drive system.

Also in an exemplary embodiment, the processor is further configured to at least facilitate selecting the selected parking spot to be a shaded parking spot when an ambient temperature exceeds a predetermined temperature threshold value and a light intensity from the sun exceeds a predetermined light intensity threshold; and a sunny parking spot when the ambient temperature exceeds the predetermined temperature threshold value and the light intensity from the sun is less than the predetermined light intensity threshold.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
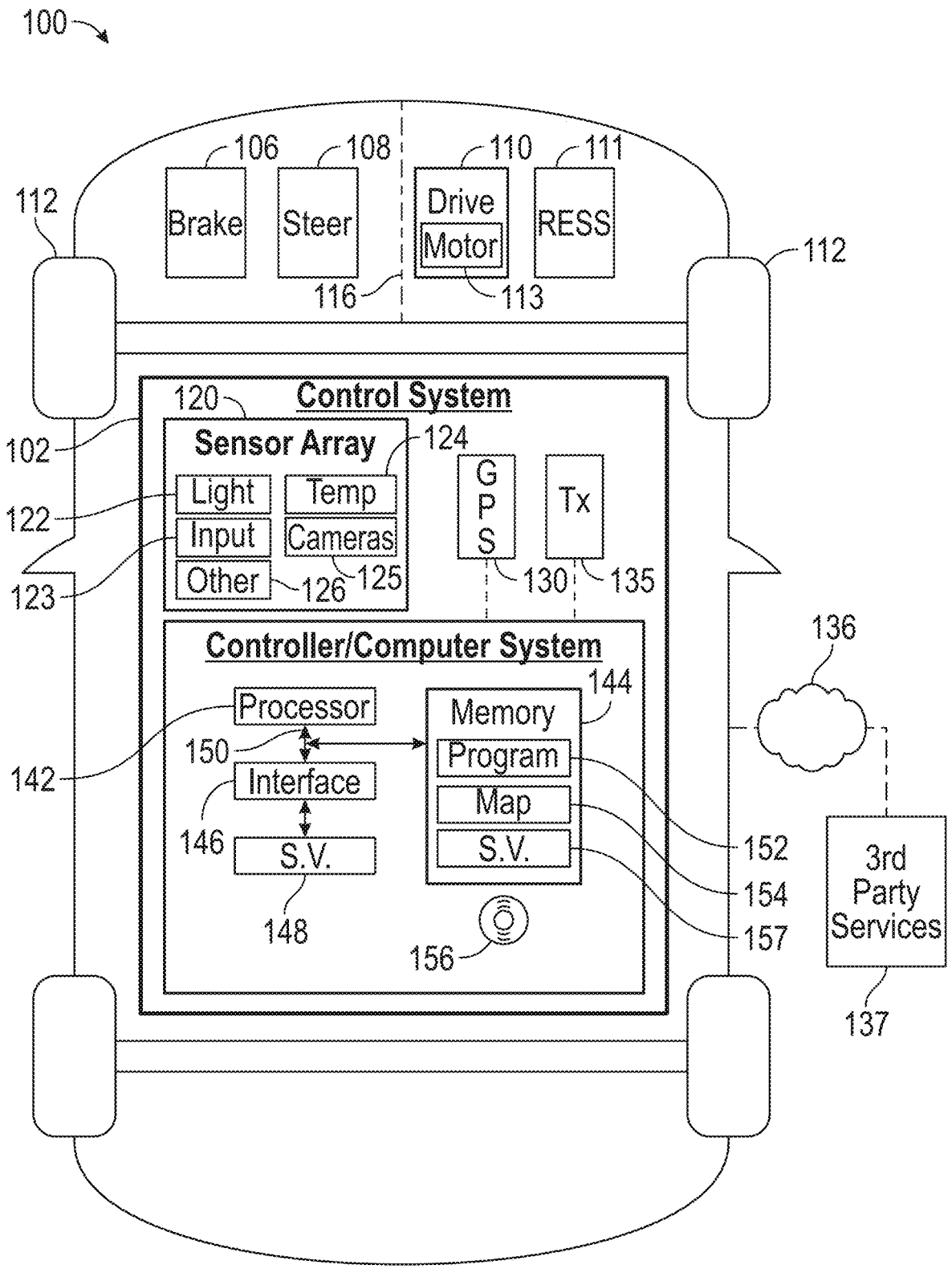
FIG. 1 is a functional block diagram of a vehicle that includes a control system for controlling autonomous parking of the vehicle, including for selecting optimal parking spots, in accordance with exemplary embodiments.

FIG. 1 illustrates a vehicle 100, according to an exemplary embodiment. As described in greater detail further below, the vehicle 100 includes, among other components, a control system 102 for controlling autonomous parking of the vehicle 100, including for selecting optimal parking spots based on temperature and sunlight (including for enhanced battery capacity, vehicle range, and/or passenger comfort), in accordance with exemplary embodiments.

In various embodiments, the vehicle 100 comprises an automobile, such as any one of a number of different types of automobiles, such as, for example, a sedan, a wagon, a truck, sport utility vehicle (SUV), or the like. In certain embodiments, the vehicle 100 may also comprise a motorcycle or other vehicle, such as aircraft, spacecraft, watercraft, and so on, and/or one or more other types of mobile platforms (e.g., a robot and/or another mobile platform).

In various embodiments, the vehicle 100 is an autonomous vehicle or semi-autonomous vehicle, in which operation of the vehicle 100 is autonomously controlled via the control system 102 either during all situations or in certain situations, including parking.

In addition, in certain embodiments the vehicle 100 is an electric vehicle, such as a fully electric vehicle or hybrid vehicle. However, this may vary in other embodiments.

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks, motorcycles, and certain other vehicles).

A drive system 110 is mounted on the chassis 116, and drives the wheels 112, for example via axles 114. In certain embodiments, the drive system 110 comprises a propulsion system having a motor 113.

Also in certain embodiments, the vehicle 100 further includes a rechargeable energy storage system (RESS 111). In certain embodiments, the RESS 111 (e.g., a vehicle battery) provides energy to drive the motor 113, and/or to operate one or more other devices and/or systems of the vehicle 100.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a brake pedal) and/or automatically via a control system (such as the control system 102 and/or one or more other control systems).

Also in exemplary embodiments, the steering system 108 controls steering of the vehicle 100 via steering components that are controlled via inputs provided by a driver (e.g., via a steering wheel), and/or automatically via a control system (such as the control system 102 and/or one or more other control systems).

Figure 2:
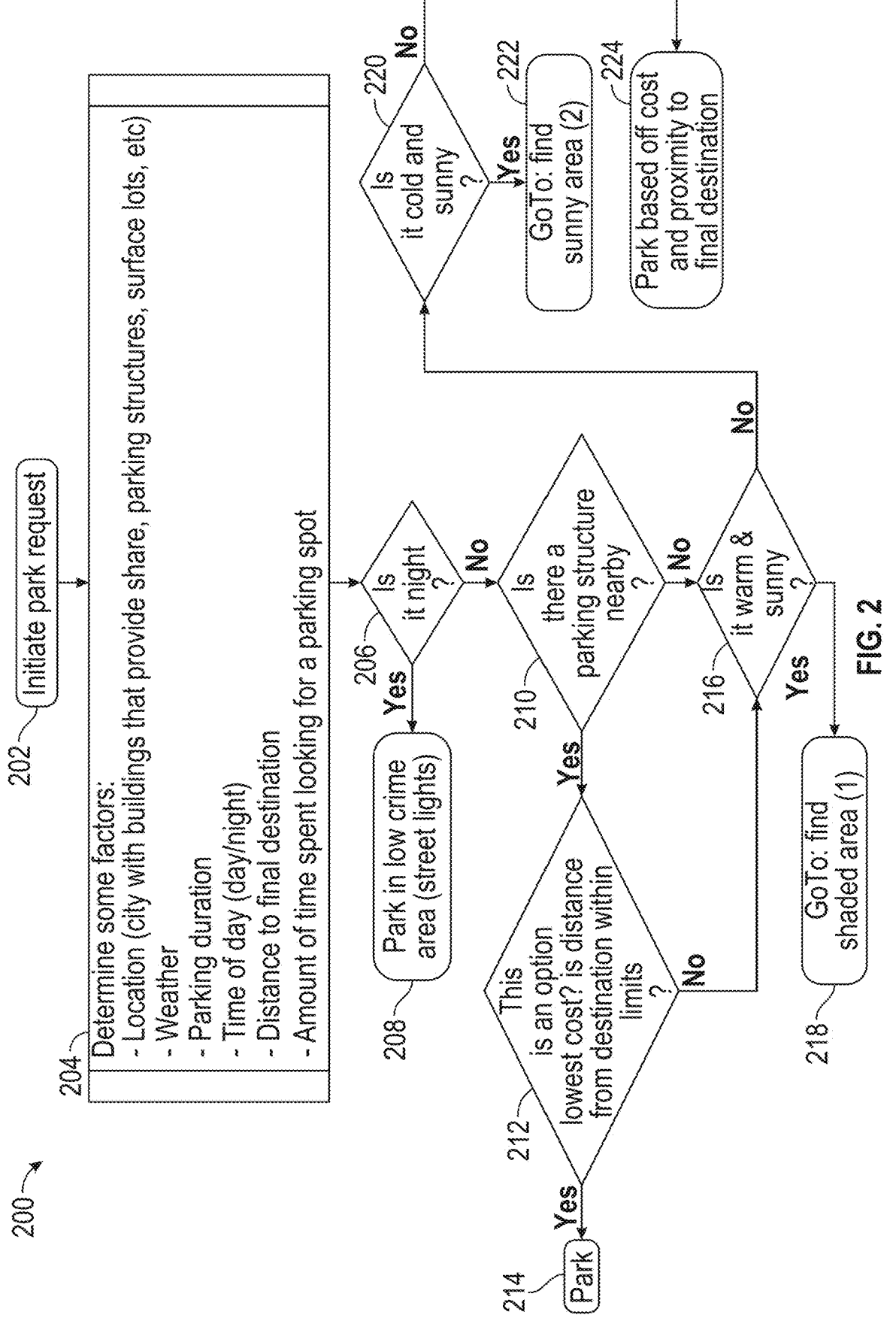
FIG. 2 is a flowchart of a process for controlling autonomous parking of a vehicle, including for selecting optimal parking spots, in accordance with exemplary embodiments.
Figure 3:
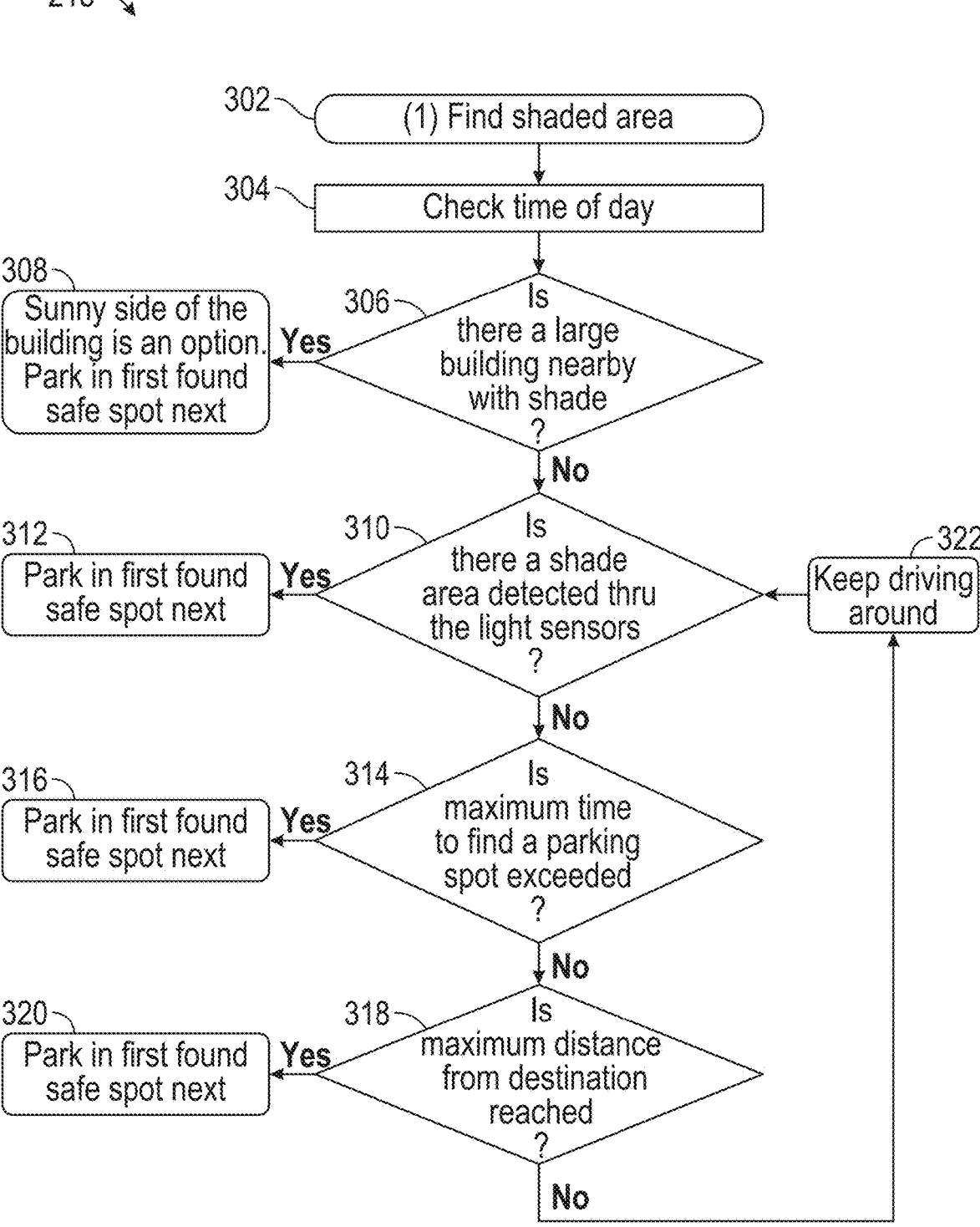
FIG. 3 is a flowchart of a step of the process of FIG. 2, namely, of finding a parking spot in a shaded area, in accordance with exemplary embodiments.
Figure 4:
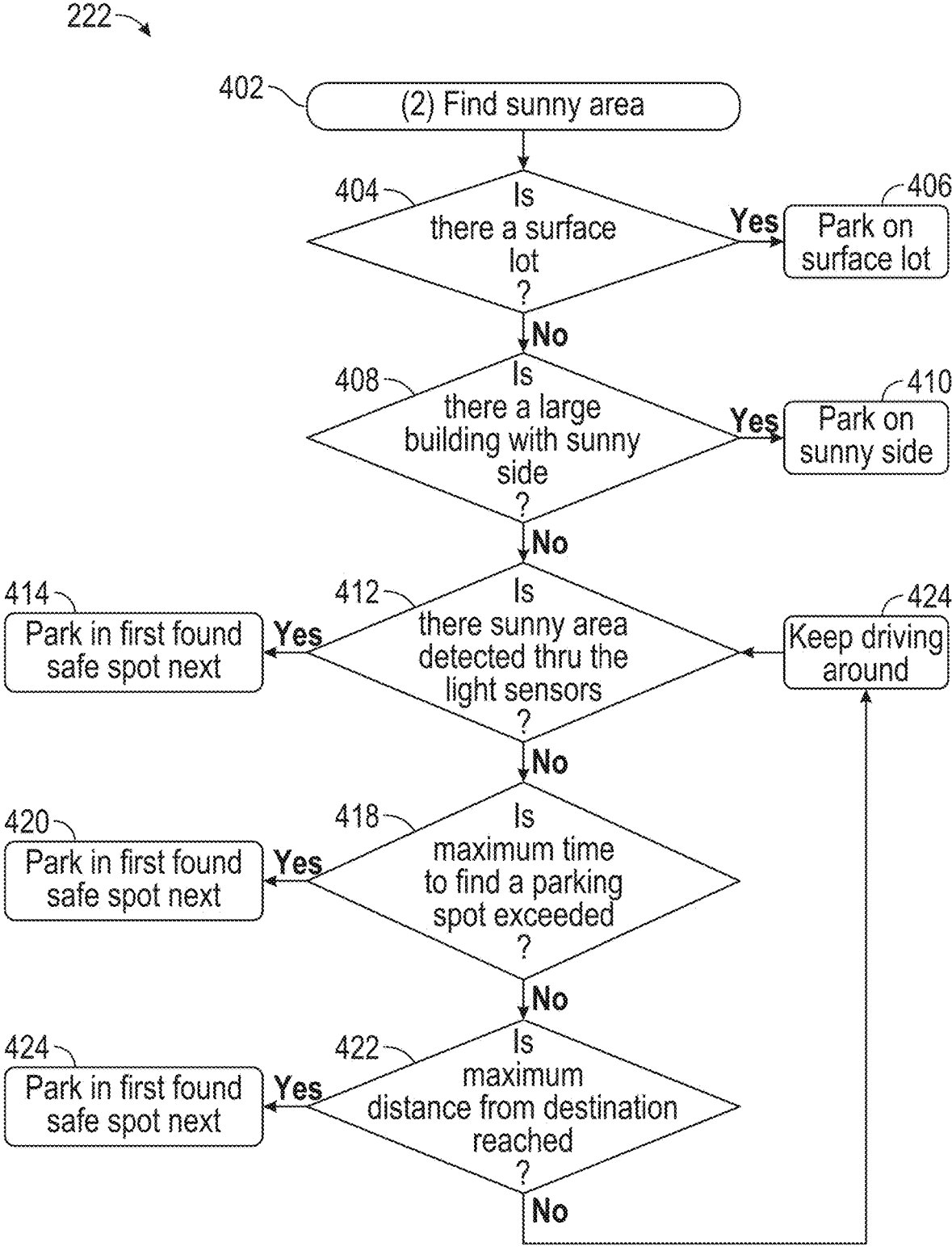
FIG. 4 is a flowchart of another step of the process of FIG. 2, namely, of finding a parking spot in a sunny area, in accordance with exemplary embodiments.

In the embodiment depicted in FIG. 1, the control system 102 is coupled to the braking system 106, the steering system 108, the drive system 110, and the RESS 111, and controls operation and functionality thereof. Also in various embodiments, the control system 102 provides for autonomous control of parking the vehicle 100, including in selecting parking locations to maximize battery capacity and/or vehicle range, and/or to achieve one or more other objectives (e.g., to maximize passenger comfort, and so on). In various embodiments, this is accomplished in accordance with the process 200 as depicted in FIGS. 2-4 and described further below in connection therewith.

Also as depicted in FIG. 1, in various embodiments, the control system 102 includes a sensor array 120, a location system 130, a transceiver 135, and a controller 140, as described in greater detail below.

In various embodiments, the sensor array 120 includes various sensors that obtain sensor data as to the vehicle 100, and/or conditions surrounding the vehicle 100. In the depicted embodiment, the sensor array 120 includes one or more light sensors 122, temperature sensors 124, input sensors 123, and optical sensors (e.g., cameras) 124. In certain embodiments, the sensor array 120 may further include one or more other sensors 126.

In various embodiments, the light sensors 122 obtain sensor data as to a brightness of light surrounding the vehicle 100, for example to provide an indication as to whether it is night versus day, and/or whether a particular location is experiencing sunshine or shade.

Also in various embodiments, the temperature sensors 124 obtain sensor data as to a temperature surrounding the vehicle 100 (e.g., an ambient air temperature).

In various embodiments, the input sensors 123 receive inputs from one or more users (e.g., passengers) of the vehicle 100. In various embodiments, the inputs may include, among other user inputs, a request for autonomous parking of the vehicle 100, along with any requests and/or constraints for the parking operation (e.g., a user preferences as to an maximum amount of time to spend looking for a parking spot, a maximum distance allowed between a selected parking spot and an ultimate location in which the user will walk or otherwise travel after the vehicle 100 is parked, and so on).

In addition, in various embodiments, the one or more optical sensors 125 include one or more cameras 125 and/or other optical sensors, and that are configured for detecting parking locations and weather conditions, and in various embodiments for detecting objects and/or other conditions surrounding the vehicle 100.

In addition, in various embodiments, the one or more other sensors 126 may include one or more detection sensors, such as one or more radar, Lidar, or the like, that can be used to detect parking locations, objects and/or conditions surrounding the vehicle 100.

In various embodiments, the location system 130 obtains data as to a geographic location of the vehicle 100. In certain embodiments, the location system 130 includes a satellite-based navigation system, such as a global positioning system (GPS) system.

In various embodiments, the transceiver 135 communicates via one or more wireless communication networks 136 (e.g., cellular, satellite, Internet-based, and/or other types of wireless communications networks). As depicted in FIG. 1, In certain embodiments, the transceiver 135 communicates via the communication networks 136 with one or more third party services 137 (e.g., that provide weather information, traffic updates, and the like in various embodiments).

In various embodiments, the controller 140 is coupled to the sensor array 120, the location system 130, and the transceiver 135, and receives data therefrom. In various embodiments, the controller 140 is further coupled to the braking system 106, steering system 108, and drive system 110, the RESS 111, and controls operation thereof.

In various embodiments, the controller 140 controls operation of autonomous driving functionality for the vehicle 100, including for parking of the vehicle 100, and specifically including selecting an optimal parking spot for the vehicle 100 based on an effect of the parking spot on a temperature of the vehicle 100 (including, in various embodiments, based on whether particular parking spots are in the sun versus in the shade, including for maximizing RESS 111 capacity, vehicle 100 range, passenger comfort, and/or one or more other purposes), and via control of the braking system 106, steering system 108, and drive system 110 (among other vehicle systems). In various embodiments, the controller 140 provides these functions in accordance with the steps of the process 200 that is depicted in FIGS. 2-4 and described in greater detail further below in connection therewith.

As depicted in FIG. 1, in various embodiments, the controller 140 comprises a computer system (also referred to herein as computer system 140), and includes a processor 142, a memory 144, an interface 146, a storage device 148, and a computer bus 150.

The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIGS. 2-4 and described further below in connection therewith.

The memory 144 can be any type of suitable memory, including various types of non-transitory computer readable storage medium. In certain examples, the memory 144 is located on and/or co-located on the same computer chip as the processor 142. In the depicted embodiment, the memory 144 stores the above-referenced program 152 along with a map database 154 (e.g., of parking lots and roadways) and other stored values 157 (e.g., look-up tables, thresholds, and/or other values with respect to autonomous control of parking of the vehicle 100).

The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and described further below in connection therewith. In another exemplary embodiment, the program product may be directly stored in and/or otherwise accessed by the memory 144 and/or a disk (e.g., disk 156), such as that referenced below.

The bus 150 serves to transmit programs, data, status and other information or signals between the various components of the computer system of the controller 140. The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program.

FIG. 2 is a flowchart of a process 200 for controlling autonomous parking of a vehicle, including for selecting optimal parking spots based on an effect on a temperature of the vehicle, in accordance with exemplary embodiments. In various embodiments, the process 200 may be implemented in connection with the vehicle 100, including the control system 102 and other components thereof. The process 200 will also be described further below in connection with FIG. 3 (which depicts a flowchart of a step of the process 200, namely, of finding a parking spot in a shaded area) and FIG. 4 (which depicts a flowchart of another step of the process 200, namely, of finding a parking spot in a sunny area) in accordance with exemplary embodiments.

As depicted in FIG. 2, in various embodiments, the process 200 begins when a vehicle park request is received (step 202). In various embodiments, the vehicle park request may be received, for example, as a user input via one or more input sensors 123 of FIG. 1. In certain embodiments, the user inputs may also include one or more requirements, limits, and/or preferences of the user, such as a maximum amount of time to look for a parking spot, a maximum distance from the parking spot to the ultimate location to which the user will move after the vehicle 100 is parked, and so on. In certain other embodiments, such requirements, limits, and/or preferences may have previously been set as prior user preferences and/or as default preferences, or the like.

In various embodiments, various parking factors are considered for selecting an appropriate parking spot (step 204). For example, in certain embodiments, the factors may include the following, among other possible factors: a location (e.g., a city with buildings that provide shade, and/or parking structures, surface lots, and so on) in which the vehicle 100 parking is to take place; weather conditions (e.g., temperature, sunlight intensity, and so on); parking duration; time of day (e.g., including daytime versus nighttime); distance to final destination (e.g., a walking distance from various parking spots for the user to reach his or her ultimate destination after parking), and an amount of time spent looking for a parking spot.

In various embodiments, a determination is made as to whether a current location is suitable for parking (step 206). In various embodiments, this determination is made by the processor 142 based on available data (e.g., including sensor data, location data, map data) as to whether the location is in a low-crime area near street lights, and so on.

In various embodiments, if it is determined that the current location is suitable for parking, then the vehicle 100 is parked accordingly at the current location (step 208). For example, in certain embodiments, the processor 142 of FIG. 1 provides instructions to the drive system 110, braking system 106, steering system 108, and/or other vehicle 100 systems and/or components to autonomously park the vehicle 100 at the current spot.

Conversely, in certain embodiments, it is instead determined that the current location is not suitable, then the process 200 instead proceeds to step 210. In various embodiments, during step 210, a determination is made as to whether a parking structure is disposed nearby. Specifically, in various embodiments, this determination is made by the processor 142 of FIG. 1, using sensor data from the sensor array 120 (e.g., the cameras 125 thereof), location data via the location system 130, and/or the map data from the map database 154 of FIG. 1.

In various embodiments, if it is determined in step 210 that a parking structure is not nearby, then the process 200 proceeds to step 216, described further below.

Conversely, in various embodiments, if it is determined in step 210 that a parking structure is nearby, then a determination is made as to both (a) whether this represents a lowest cost parking option, and (b) whether a distance of the parking spot to a location to be reached by the user after parking the vehicle 100 is within a predetermined range or limits (e.g., as stored in the stored values 157 in the memory 144 of FIG. 1). In various embodiments, these determinations are also made by the processor 142 of FIG. 1.

In various embodiments, if it is determined in step 212 that both (a) the current location or parking structure represents a lowest cost parking option, and (b) the distance of the parking spot to the location to be reached by the user is within the predetermined range or limits, then the vehicle 100 is parked at the location (step 214). Specifically, in certain embodiments, the processor 142 of FIG. 1 provides instructions to the drive system 110, braking system 106, steering system 108, and/or other vehicle 100 systems and/or components to autonomously park the vehicle 100 at the location (e.g., parking garage).

Conversely, in various embodiments, if it is instead determined in step 212 that either (a) the current location or parking structure does not represent a lowest cost parking option, or (b) the distance of the parking spot to the location to be reached by the user is not within the predetermined range or limits, or both, then the process 200 proceeds to step 216, described below.

In various embodiments, during step 216, a determination is made as to whether it is warm and sunny outside. In various embodiments, during step 216, the processor 142 of FIG. 1 makes this determination whether a sun intensity exceeds a predetermined value and a temperature value exceeds a predetermined value, and/or whether some combination of temperature and sun intensity exceeds a predetermined value, or the like. Also in various embodiments, this determination is made by the processor 142 based on sensor data (e.g., from the light sensors 122, temperature sensors 124, and/or cameras 125), and/or from one or more third party services 137 (e.g., such as a third party weather service, and so on).

In various embodiments, if it is determined that it is warm and sunny outside, then a determination is made to find a parking spot in a shaded area (e.g., in an area with a sun intensity that is less than a predetermined value) (step 218). In various embodiments, this determination is made, and implemented, by the processor 142 of FIG. 1.

With reference to FIG. 3, a flowchart is provided for the step of finding a parking spot in shaded area (i.e., corresponding to step 218 of FIG. 2). In various embodiments, as depicted in FIG. 3, step 218 begins at step 302 with the instruction to find a shady parking spot. In various embodiments, a determination as made as to a time of day (step 304).

In addition, in various embodiments, a determination is made as to whether a building is nearby of sufficient size that may provide shade (step 306). In various embodiments, this determination may be made by the processor 142 of FIG. 1, for example including the sensor data from the sensor array 120 (e.g., the cameras 125 thereof), in combination location data from the location system 130, the map database 154, and the like, among other possible data. In various embodiments, this determination may also be based upon the time of day, as determined in step 304.

In various embodiments, if it is determined in step 306 that there is a building nearby that provides shade, then in various embodiments the vehicle 100 is parked accordingly in proximity to the building (step 308). Specifically, in certain embodiments, the processor 142 of FIG. 1 provides instructions to the drive system 110, braking system 106, steering system 108, and/or other vehicle 100 systems and/or components to autonomously park the vehicle 100 in proximity to the building (e.g., on a side of the building that is either currently in the shade or expected to soon be in the shade). In certain embodiments, the first safe spot next to the building is selected.

Conversely, in various embodiments, if it is instead determined in step 306 that there is not a building nearby to provide shade, then the process 200 instead proceeds to step 310. In various embodiments, during step 310, a determination is made as to whether a nearby shady area is detected via one or more sensors (such as the light sensors 122 and/or cameras 125 of FIG. 1).

In various embodiments, if it is determined in step 310 that a nearby shady area is detected via one or more sensors, then the vehicle 100 is parked accordingly in the shady area (step 312). Specifically, in certain embodiments, the processor 142 of FIG. 1 provides instructions to the drive system 110, braking system 106, steering system 108, and/or other vehicle 100 systems and/or components to autonomously park the vehicle 100 in the shady area. In certain embodiments, the first safe spot next in the shady area is selected.

Conversely, in various embodiments, if it is instead determined in step 310 that a nearby shady area is not detected via one or more sensors, then the process 200 instead proceeds to step 314. In various embodiments, during step 314, a determination is made as to whether a maximum amount of time to find a parking spot has been exceeded.

In various embodiments, if it is determined in step 314 the maximum amount of time to find a parking spot has been exceeded, then in various embodiments the vehicle 100 is parked nearby (step 316). Specifically, in certain embodiments, the processor 142 of FIG. 1 provides instructions to the drive system 110, braking system 106, steering system 108, and/or other vehicle 100 systems and/or components to autonomously park the vehicle 100 near the present location. In certain embodiments, the first safe spot by the present location is selected.

Conversely, in various embodiments, if it is instead determined in step 314 that the maximum amount of time to find a parking spot has not been exceeded, then the process 200 instead proceeds to step 318. In various embodiments, during step 318, a determination is made as to whether a maximum distance from the user's destination has been reached (e.g., a maximum distance that the user is willing to walk or otherwise travel from a parking spot to the user's intended destination).

In various embodiments, if it is determined in step 318 the maximum distance from the user's destination has been reached, then in various embodiments the vehicle 100 is parked nearby (step 320). Specifically, in certain embodiments, the processor 142 of FIG. 1 provides instructions to the drive system 110, braking system 106, steering system 108, and/or other vehicle 100 systems and/or components to autonomously park the vehicle 100 near the present location. In certain embodiments, the first safe spot by the present location is selected.

Conversely, in various embodiments, if it is instead determined in step 318 that the maximum distance from the user's destination has not been reached, then the process 200 instead proceeds to step 322. In various embodiments, during step 322, the search for a parking spot continues, as the vehicle 100 continues to be driven autonomously via the processor 142 in search for a shaded parking spot. In various embodiments, the process 200 returns to step 310, and repeats therefrom in a new iteration until a shaded parking spot is selected and the vehicle 100 is parked therein.

With reference back to FIG. 2, in various embodiments, if it is determined in step 216 that it is not a warm, sunny day (e.g., if the ambient temperature is less than a predetermined threshold and/or an ambient light intensity is less than a predetermined threshold, in certain embodiments), then the process 200 proceeds instead to step 222. In various embodiments, during step 222, a determination is made to find a parking spot in a sunny area (e.g., in an area with a sun intensity that exceeds a predetermined value for that particular area, notwithstanding the overall ambient conditions). In various embodiments, this determination is made, and implemented, by the processor 142 of FIG. 1.

With reference to FIG. 4, a flowchart is provided for the step of finding a parking spot in a sunny area (i.e., corresponding to step 222 of FIG. 2). In various embodiments, as depicted in FIG. 4, step 222 begins at step 402 with the instruction to find a sunny parking spot.

In addition, in various embodiments, a determination is made as to whether a surface parking lot is nearby for sufficient exposure to the sun (step 404). In various embodiments, this determination may be made by the processor 142 of FIG. 1, for example including sensor data from the sensor array 120 (e.g., the cameras 125 and/or light sensors 122 thereof), location data from the location system 130 of FIG. 1, and/or the map database 154 of FIG. 1. If it is determined in step 404 that there is a nearby surface parking lot with sufficient exposure to the sun, then in various embodiments the vehicle 100 is parked accordingly in the surface parking lot (step 406). Specifically, in certain embodiments, the processor 142 of FIG. 1 provides instructions to the drive system 110, braking system 106, steering system 108, and/or other vehicle 100 systems and/or components to autonomously park the vehicle 100 in the surface lot. In certain embodiments, the first safe spot in the surface parking lot is selected.

Conversely, if it is instead determined in step 404 that there is not a nearby surface parking lot with sufficient exposure to the sun, then the process 200 proceeds instead to step 408. In various embodiments, during step 408, a determination is made as to whether a building is nearby of sufficient size that also has a sunny side with exposure to the sun. In various embodiments, this determination may be made by the processor 142 of FIG. 1, for example including the sensor data from the sensor array 120 (e.g., the cameras 125 and/or light sensors 122 thereof), in combination location data from the location system 130, the map database 154, and the like, among other possible data. In various embodiments, this determination may also be based upon the time of day.

In various embodiments, if it is determined in step 408 that there is a building nearby with a sunny side that provides sufficient exposure to the sun (e.g., with a light intensity that exceeds a predetermined threshold), then in various embodiments the vehicle 100 is parked accordingly in proximity to a sunny side of the building (step 410). Specifically, in certain embodiments, the processor 142 of FIG. 1 provides instructions to the drive system 110, braking system 106, steering system 108, and/or other vehicle 100 systems and/or components to autonomously park the vehicle 100 in proximity to the building (e.g., on a side of the building that is either currently in the sun or expected to soon be in the sun). In certain embodiments, the first safe spot next to the building (e.g., on a sunny side of the building) is selected.

Conversely, in various embodiments, if it is instead determined in step 408 that there is not a building with a sunny side (e.g., with a light intensity that exceeds a predetermined threshold), then the process 200 instead proceeds to step 412. In various embodiments, during step 412, a determination is made as to whether a nearby sunny area is detected via one or more sensors (such as the light sensors 122 of FIG. 1).

In various embodiments, if it is determined in step 412 that there is a nearby sunny area detected via one or more sensors, then the process proceeds step 414. In various embodiments, during step 414, the vehicle 100 is parked accordingly in the sunny area. Specifically, in certain embodiments, the processor 142 of FIG. 1 provides instructions to the drive system 110, braking system 106, steering system 108, and/or other vehicle 100 systems and/or components to autonomously park the vehicle 100 in the sunny area. In certain embodiments, the first safe spot in the sunny area is selected.

Conversely, in various embodiments, if it is instead determined in step 412 that there is not a nearby sunny area detected via one or more sensors, then the process 200 proceeds instead to step 418. In various embodiments, during step 418, a determination is made as to whether a maximum amount of time to find a parking spot has been exceeded.

In various embodiments, if it is determined in step 418 that the maximum amount of time to find a parking spot has been exceeded, then in various embodiments the vehicle 100 is parked nearby (step 420). Specifically, in certain embodiments, the processor 142 of FIG. 1 provides instructions to the drive system 110, braking system 106, steering system 108, and/or other vehicle 100 systems and/or components to autonomously park the vehicle 100 near the present location. In certain embodiments, the first safe spot by the present location is selected.

Conversely, in various embodiments, if it is instead determined in step 418 that the maximum amount of time to find a parking spot has not been exceeded, then the process 200 instead proceeds to step 422. In various embodiments, during step 422, a determination is made as to whether a maximum distance from the user's destination has been reached (e.g., a maximum distance that the user is willing to walk or otherwise travel from a parking spot to the user's intended destination).

In various embodiments, if it is determined in step 422 the maximum distance from the user's destination has been reached, then in various embodiments the vehicle 100 is parked nearby (step 424). Specifically, in certain embodiments, the processor 142 of FIG. 1 provides instructions to the drive system 110, braking system 106, steering system 108, and/or other vehicle 100 systems and/or components to autonomously park the vehicle 100 near the present location. In certain embodiments, the first safe spot by the present location is selected.

Conversely, in various embodiments, if it is instead determined in step 422 that the maximum distance from the user's destination has not been reached, then the process 200 instead proceeds to step 424. In various embodiments, during step 424, the search for a parking spot continues, as the vehicle 100 continues to be driven autonomously via the processor 142 in search for a sunny parking spot. In various embodiments, the process 200 returns to step 412, and repeats therefrom in a new iteration until a sunny parking spot is selected and the vehicle 100 is parked therein.

With reference back to FIG. 2, in various embodiments, if it is determined in step 220 that the environment is not cold and sunny (e.g., that a temperature is less than a predetermined value, a light intensity is less than a predetermined value, or both), then the process 200 proceeds instead to step 224. In various embodiments, during step 224, parking is instead based on cost (including financial costs, and in certain embodiments other costs) and proximity to the user's final destination, without regarding to the ultimate parking spot being in the sun or in the shade.

Accordingly, methods, systems, and vehicles are provided for autonomous parking of vehicles in a selected parking spot based on an effect of the parking spot on a temperature of the vehicle. In various embodiments, the parking lot is selected by a processor based on sensor data and/or other information pertaining to current environmental and/or weather conditions (e.g., including time of day, day of year, temperature, light intensity, and so on). Also in various embodiments, a shady parking spot (with relatively lesser sunlight intensity) or a sunny parking spot (e.g., with relatively greater sunlight intensity) is selected based on existing weather conditions in order to maximize RESS capability and/or vehicle range, and/or to provide user comfort and/or accomplish one or more other objectives relating thereto.

For example, in various embodiments, during a hot summer day a shaded parking spot may be automatically selected by the processor 142, for the purposes of maximizing (i) capacity of the RESS 111; (ii) range of the vehicle 100; and/or (iii) comfort of the passengers in the vehicle 100 (e.g., so that the vehicle 100 is relatively warm when the users return to the vehicle 100). Conversely, also in various embodiments, during a cold winter day a sunny parking spot may be automatically selected by the processor, for the purposes of maximizing (i) capacity of the RESS 111; (ii) range of the vehicle 100; and/or (iii) comfort of the passengers in the vehicle 100 (e.g., so that the vehicle 100 is relatively cool when the users return to the vehicle 100).

It will be appreciated that the systems, vehicles, and methods may vary from those depicted in the Figures and described herein. For example, the vehicle 100 of FIG. 1, including the control system 102 and/or other components thereof, may vary in different embodiments from that depicted in FIG. 1 and/or described above in connection therewith. It will similarly be appreciated that the steps of the process 200 and the steps and subprocesses thereof may differ from those depicted in FIGS. 2-4, and/or that various steps of the process 200 may occur concurrently and/or in a different order than that depicted in FIGS. 2-4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

receiving a request for autonomous parking of a vehicle;

upon receiving the request, obtaining information collected by one or more sensors regarding the vehicle and a plurality of potential parking spots for the vehicle, wherein the information obtained comprises at least:

an ambient temperature of a cabin of the vehicle at the time of receiving the request;

geographic location information for each of the plurality of potential parking spots, each geographic location information including weather conditions, temperature data, sun intensity data, a crime rate, and a label as either "shaded" or "sunny" based on whether any structures are present that can provide shade for the vehicle;

a final destination for an occupant of the vehicle;

a parking duration of time for which the vehicle is to remain parked; and a time of day during which the vehicle is to remain parked;

calculating supplemental data, via a processor of the vehicle communicatively coupled to the one or more sensors, based on the information obtained, wherein the supplemental data calculated comprises at least:

a distance from each of the plurality of parking spots to the final destination;

an amount of time that has passed since receiving the request; and expected changes over time of the ambient temperature of the cabin of the vehicle assuming the vehicle were to remain parked for the parking duration at each of the plurality of potential parking spots;

assigning a score to each of the plurality of potential parking spots, via the processor of the vehicle, by analyzing the information obtained and the supplemental data calculated;

selecting, via the processor of the vehicle, one of the plurality of potential parking spots as a selected parking spot for the vehicle, based on the score assigned to each of the plurality of potential parking spots; and autonomously parking the vehicle in the selected parking spot, in accordance with instructions provided by the processor.

2. The method of claim 1, wherein the information obtained is at least partly comprised of weather service data obtained via one or more remote servers that are remote from the vehicle.

3. The method of claim 1, wherein the temperature data for each of the plurality of potential parking spots includes an outdoor ambient temperature; and wherein the selected parking spot that is selected via the processor:

includes a "shaded" label when the outdoor ambient temperature exceeds a predetermined temperature threshold value and the sun intensity exceeds a predetermined sun intensity threshold, and includes a "sunny" label when the outdoor ambient temperature exceeds the predetermined temperature threshold value and the sun intensity is less than the predetermined sun intensity threshold.

4. The method of claim 1, wherein the vehicle includes a rechargeable energy storage system (RESS);

wherein the supplemental data calculated further includes a determination as to how the expected changes over time of the ambient temperature of the cabin of the vehicle assuming the vehicle were to remain parked for the parking duration at each of the plurality of potential parking spots would impact a capacity of the RESS; and wherein the selected parking spot is selected via the processor in a manner that maximizes the capacity of the RESS.

5. The method of claim 1, wherein the supplemental data calculated further includes a determination as to how the expected changes over time of the ambient temperature of the cabin of the vehicle assuming the vehicle were to remain parked for the parking duration at each of the plurality of potential parking spots would impact a driving range of the vehicle; and wherein the selected parking spot is selected via the processor in a manner that maximizes the driving range of the vehicle.

6. The method of claim 1, wherein the information obtained further includes user preferences including a maximum time for determining and subsequently autonomously parking the vehicle in the selected parking spot and a maximum walking distance for the occupant upon exiting the vehicle at the selected parking spot; and wherein the selected parking spot is selected via the processor further based on:

a first comparison of the amount of time that has passed since receiving the request with the maximum time for determining and subsequently autonomously parking the vehicle in each of the plurality of potential parking spots; and a second comparison of the distance from each of the plurality of potential parking spots with the maximum walking distance for the occupant upon exiting the vehicle at each of the plurality of potential parking spots.

7. The method of claim 1, wherein the information obtained includes user preferences with regards to the label of the geographic location information for each of the plurality of potential parking spots being either "shaded" or "sunny"; and wherein the selected parking spot is selected via the processor further based on a combination of the user preferences and one or more of: a current time of day, a current month, a current time period of year, and/or a current season.

8. The method of claim 1, wherein the geographic location information used for determining whether any structures are present that can provide shade for the vehicle for each of the plurality of potential parking spots also includes whether the shade that can be provided is due to a side of a building.

9. A system comprising:

one or more sensors configured to at least facilitate:

receiving a request for autonomous parking of a vehicle;

upon receiving the request, obtaining information regarding the vehicle and a plurality of potential parking spots for the vehicle, wherein the information obtained comprises at least:
    an ambient temperature of a cabin of the vehicle at the time of receiving the request;
    geographic location information for each of the plurality of potential parking spots, each geographic location information including weather conditions, temperature data, sun intensity data, a crime rate, and a label as either "shaded" or "sunny" based on whether any structures are present that can provide shade for the vehicle;
    a final destination for an occupant of the vehicle;
    a parking duration of time for which the vehicle is to remain parked; and
    a time of day during which the vehicle is to remain parked; and
a processor that is communicatively coupled to the one or more sensors and that is configured to at least facilitate:
    calculating supplemental data, based on the information obtained, wherein the supplemental data calculated comprises at least:
        a distance from each of the plurality of potential parking spots to the final destination;
        an amount of time that has passed since receiving the request; and
        expected changes over time of the ambient temperature of the cabin of the vehicle assuming the vehicle were to remain parked for the parking duration at each of the plurality of potential parking spots;
    assigning a score to each of the plurality of potential parking spots, by analyzing the information obtained and the supplemental data calculated;
    selecting one of the plurality of potential parking spots as a selected parking spot for the vehicle, based on the score assigned to each of the plurality of potential parking spots; and
    autonomously parking the vehicle in the selected parking spot, in accordance with instructions provided by the processor.

10. The system of claim 9, wherein:
the one or more sensors are configured to collect at least a portion of the information directly from the vehicle and at the plurality of potential parking spots; and
the information obtained is at least partly comprised of weather service data obtained via one or more remote servers that are remote from the vehicle.

11. The system of claim 10, wherein the information obtained is at least partly based on weather conditions surrounding the vehicle as at least partly determined from the weather service data obtained.

12. The system of claim 9,
wherein the temperature data for each of the plurality of potential parking spots includes an outdoor ambient temperature; and
wherein the selected parking spot that is selected via the processor:
    includes a "shaded" label when the outdoor ambient temperature exceeds a predetermined temperature threshold value and the sun intensity exceeds a predetermined sun intensity threshold, and
    includes a "sunny" label when the outdoor ambient temperature exceeds the predetermined temperature threshold value and the sun intensity is less than the predetermined sun intensity threshold.

13. The system of claim 9,
wherein the vehicle includes a rechargeable energy storage system (RESS);
wherein the supplemental data calculated further includes a determination as to how the expected changes over time of the ambient temperature of the cabin of the vehicle assuming the vehicle were to remain parked for the parking duration at each of the plurality of potential parking spots would impact a capacity of the RESS; and
wherein the selected parking spot is selected via the processor in a manner that maximizes the capacity of the RESS.

14. The system of claim 9,
wherein the supplemental data calculated further includes a determination as to how the expected changes over time of the ambient temperature of the cabin of the vehicle assuming the vehicle were to remain parked for the parking duration at each of the plurality of potential parking spots would impact a driving range of the vehicle; and
wherein the selected parking spot is selected via the processor in a manner that maximizes the driving range of the vehicle.

15. The system of claim 9,
wherein the information obtained further includes user preferences including a maximum time for determining and subsequently autonomously parking the vehicle in the selected parking spot and a maximum walking distance for the occupant upon exiting the vehicle at the selected parking spot; and
wherein the selecting of the selected parking spot is further based on:
    a first comparison of the amount of time that has passed since receiving the request with the maximum time for determining and subsequently autonomously parking the vehicle in each of the plurality of potential parking spots; and
    a second comparison of the distance from each of the plurality of potential parking spots with the maximum walking distance for the occupant upon exiting the vehicle at each of the plurality of potential parking spots.

16. The system of claim 9,
wherein the information obtained includes user preferences with regards to the label of the geographic location information for each of the plurality of potential parking spots being either "shaded" or "sunny"; and
wherein the selected parking spot is selected via the processor further based on a combination of the user preferences and one or more of: a current time of day, a current month, a current time period of year, and/or a current season.

17. The system of claim 9, wherein the geographic location information used for determining whether any structures are present that can provide shade for the vehicle for each of the plurality of potential parking spots also includes whether the shade that can be provided is due to a side of a building.

18. A vehicle comprising:
a drive system;
an information reception system comprised of one or more sensors and one or more receivers, the information reception system configured to at least facilitate:
    receiving a request for autonomous parking of a vehicle;

upon receiving the request, obtaining information regarding the vehicle and a plurality of potential parking spots for the vehicle, wherein the information obtained comprises at least:

an ambient temperature of a cabin of the vehicle at the time of receiving the request;

geographic location information for each of the plurality of potential parking spots, each geographic location information including weather conditions, temperature data, sun intensity data, a crime rate, and a label as either "shaded" or "sunny" based on whether any structures are present that can provide shade for the vehicle;

a final destination for an occupant of the vehicle;

a parking duration of time for which the vehicle is to remain parked; and a time of day during which the vehicle is to remain parked; and a processor that is communicatively coupled to the information reception system and that is configured to at least facilitate:

calculating supplemental data, based on the information obtained, wherein the supplemental data calculated comprises at least:

a distance from each of the plurality of potential parking spots to the final destination;

an amount of time that has passed since receiving the request; and expected changes over time of the ambient temperature of the cabin of the vehicle assuming the vehicle were to remain parked for the parking duration at each of the plurality of potential parking spots;

assigning a score to each of the plurality of potential parking spots, by analyzing the information obtained and the supplemental data calculated;

selecting one of the plurality of potential parking spots as a selected parking spot for the vehicle, based on the score assigned to each of the plurality of potential parking spots; and autonomously parking the vehicle in the selected parking spot, in accordance with instructions provided by the processor that are carried out by the drive system.

19. The vehicle of claim 18, wherein the information obtained includes user preferences with regards to the label of the geographic location information for each of the plurality of potential parking spots being either "shaded" or "sunny"; and wherein the selected parking spot is selected via the processor further based on a combination of the user preferences and one or more of: a current time of day, a current month, a current time period of year, and/or a current season.

20. The vehicle of claim 18, wherein the geographic location information used for determining whether any structures are present that can provide shade for the vehicle for each of the plurality of potential parking spots also includes whether the shade that can be provided is due to a side of a building.

* * * * *